United States Patent
Chen et al.

(10) Patent No.: US 12,470,729 B2
(45) Date of Patent: Nov. 11, 2025

(54) METHODS AND APPARATUSES FOR SIGNALING OF MERGE MODES IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xiaoyu Xiu, San Diego, CA (US); Tsung-Chuan Ma, San Diego, CA (US); Hong-Jheng Jhu, Beijing (CN); Shuiming Ye, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 466 days.

(21) Appl. No.: 17/488,168

(22) Filed: Sep. 28, 2021

(65) Prior Publication Data

US 2022/0021894 A1    Jan. 20, 2022

Related U.S. Application Data

(63) Continuation of application No. PCT/US2020/027525, filed on Apr. 9, 2020.
(Continued)

(51) Int. Cl.
*H04N 19/103* (2014.01)
*H04N 19/105* (2014.01)
(Continued)

(52) U.S. Cl.
CPC ........... *H04N 19/44* (2014.11); *H04N 19/105* (2014.11); *H04N 19/13* (2014.11); *H04N 19/137* (2014.11);
(Continued)

(58) Field of Classification Search
CPC ...... H04N 19/44; H04N 19/105; H04N 19/13; H04N 19/137; H04N 19/159;
(Continued)

(56) References Cited

U.S. PATENT DOCUMENTS 9,998,755 B2 * 6/2018 Lin ...................... H04N 19/597
10,104,378 B2 * 10/2018 Laroche ............... H04N 19/192
(Continued)

FOREIGN PATENT DOCUMENTS

CN    102907100 A    1/2013
CN    105493505 A    4/2016
(Continued)

OTHER PUBLICATIONS

ITU-T, Versatile Video Coding (Draft 4) (Year: 2019).*
(Continued)

*Primary Examiner* — Philip P. Dang
(74) *Attorney, Agent, or Firm* — Arch & Lake LLP; Hao Tan; Shen Wang

(57) ABSTRACT

A method for video coding is provided. The method includes: determining a signaling of merge modes for deriving motion information of a current block, where the merge modes include: regular merge mode and extended merge modes; and deriving motion information of the current block using the regular merge mode, upon determining that the signaling of merge modes includes a positive signal of regular merge mode.

15 Claims, 9 Drawing Sheets

Related U.S. Application Data

(60) Provisional application No. 62/831,716, filed on Apr. 9, 2019.

(51) Int. Cl.

| | | |
|---|---|---|
| *H04N 19/115* | (2014.01) | |
| *H04N 19/13* | (2014.01) | |
| *H04N 19/137* | (2014.01) | |
| *H04N 19/159* | (2014.01) | |
| *H04N 19/176* | (2014.01) | |
| *H04N 19/44* | (2014.01) | |
| *H04N 19/46* | (2014.01) | |

(52) U.S. Cl.
CPC ......... *H04N 19/159* (2014.11); *H04N 19/176* (2014.11); *H04N 19/46* (2014.11)

(58) Field of Classification Search
CPC .... H04N 19/176; H04N 19/46; H04N 19/119; H04N 19/61; H04N 19/107; H04N 19/109; H04N 19/513
See application file for complete search history.

(56) References Cited

U.S. PATENT DOCUMENTS

| | | | | |
|---|---|---|---|---|
| 10,200,719 | B2 * | 2/2019 | Zhang | H04N 19/649 |
| 10,390,015 | B2 * | 8/2019 | Hu | H04N 19/48 |
| 10,812,807 | B2 * | 10/2020 | Jang | H04N 19/124 |
| 10,819,987 | B2 * | 10/2020 | Jang | H04N 19/159 |
| 10,939,137 | B2 * | 3/2021 | Ikai | H04N 19/186 |
| 11,310,517 | B2 * | 4/2022 | Jun | H04N 19/60 |
| 11,418,816 | B2 * | 8/2022 | Hanhart | H04N 19/597 |
| 11,438,605 | B2 * | 9/2022 | He | H04N 19/467 |
| 11,706,405 | B2 * | 7/2023 | Heo | H04N 19/11 375/240.02 |
| 2013/0022117 | A1 | 1/2013 | Lou et al. | |
| 2013/0077689 | A1 | 3/2013 | Lim et al. | |
| 2013/0077691 | A1 | 3/2013 | Zheng et al. | |
| 2014/0029670 | A1 | 1/2014 | Kung et al. | |
| 2014/0146894 | A1 | 5/2014 | Yu et al. | |
| 2016/0330444 | A1 | 11/2016 | Lim et al. | |
| 2017/0099495 | A1 | 4/2017 | Rapaka et al. | |
| 2017/0150176 | A1 * | 5/2017 | Zhang | H04N 19/122 |
| 2017/0244975 | A1 * | 8/2017 | Huang | H04N 19/61 |
| 2017/0280159 | A1 | 9/2017 | Xu et al. | |
| 2018/0124398 | A1 | 5/2018 | Park et al. | |
| 2018/0332312 | A1 | 11/2018 | Liu et al. | |
| 2019/0028731 | A1 | 1/2019 | Chuang et al. | |
| 2019/0052886 | A1 | 2/2019 | Chiang et al. | |
| 2019/0098333 | A1 | 3/2019 | Laroche et al. | |

FOREIGN PATENT DOCUMENTS

| | | | | |
|---|---|---|---|---|
| CN | 107005708 | A | 8/2017 | |
| CN | 107046642 | A | 8/2017 | |
| CN | 107079161 | A | 8/2017 | |
| CN | 107113440 | A | 8/2017 | |
| CN | 107409225 | A | 11/2017 | |
| CN | 107409227 | A | 11/2017 | |
| CN | 109479141 | A | 3/2019 | |
| CN | 116506609 | B | 3/2024 | |
| EP | 2924996 | A1 | 9/2015 | |
| GB | 2582929 | * | 4/2019 | ............ H04N 19/52 |
| WO | WO-2019006363 | A1 * | 1/2019 | ........... H04N 19/577 |
| WO | WO-2019194653 | A1 * | 10/2019 | ........... H04N 19/119 |

OTHER PUBLICATIONS

Bross, Benjamin et al., "Versatile Video Coding (Draft 3)", Joint Video Experts Team (JVET) of ITU-T SG 16 WP 3 and ISO/IEC JTC 1/SC 29/WG 11, JVET-L1001-v9, 12th Meeting: Macao, China, Oct. 3-12, 2018, (37p).

First Office Action issued in counterpart Chinese Application No. 202111350324.4 dated Jul. 8, 2022 with English translation, (20p).

Extended European Search Report of EP Application No. 21195684.2 dated Mar. 14, 2022, (8p).

Chen, Yi-Wen, et al., (Source: Kwai Inc.), "Non-CE4: Regular Merge Flag Coding", JVET-M0231, Joint Video Experts Team (JVET) of ITU-T SG 16 WP 3 and ISO/IEC JTC 1/SC 29/WG 11, 13th Meeting, Marrakech, MA, Jan. 9-18, 2019 (3p).

Sugio, Toshiyasu et al., "Parsing Robustness for Merge/AMVP," Joint Collaborative Team on Video Coding (JCT-VC) of ITU-T SG16 WP3 and ISO/IEC JTC1/SC29/WG11, JCTVC-F470, WG11 No. m20900, 6th Meeting: Torino, IT Jul. 14-22, 2011, (33p).

Chen, Jianle et al., "Algorithm description for Versatile Video Coding and Test Model 3 (VTM3)", Joint Video Experts Team (JVET) of ITU-T SG 16 WP 3 and ISO/IEC JTC 1/SC 29/WG 11, JVET-L1002-v1, 12th Meeting: Macao, China Oct. 3-12, 2018, (48p).

International Search Report of International Application No. PCT/US2020/027525 dated Jul. 23, 2020, (2p).

Chen, Yi-Wen, et al., (Source: Kwai Inc.), "Non-CE4: Regular Merge Flag Coding", JVET-M0231, Joint Video Experts Team (JVET) of ITU-T SG 16 WP 3 and ISO/IEC JTC 1/SC 29/WG 11, 13th Meeting, Marrakech, MA, Jan. 9, 2019 (3p).

Zhao, Jie et al., (Source: LG Electronics) "CE10-Related: Size Constraint on Triangular Prediction", JVET-M0438, Joint Video Experts (JVET) of ITU-T SG 16 WP 3 and ISO/IEC JTC 1/SC 29/WG 11, 13th Meeting, Marrakech, MA, Jan. 8, 2019 (2p).

Ahn, Yongjo, et al., (Source: Digital Insights Inc.) "CE4-Related: Syntax Changes of Merge Data", JVET-M0369-v1, Joint Video Experts Team (JVET) of ITU-T SG 16 WP 3 and ISO/IEC JTC 1/SC 2 9/WG 11, 13th Meeting, Marrakech, MA, Jan. 11, 2019, (5p).

Yan-fei Shen et al."High Efficiency Video Coding", Chinese Journal of Computers, vol. 36, No. 11 dated Nov. 2013, (16p).

Yang-wei Qin,"Research on Inter Prediction Algorithm of High Efficient Video Coding", Chongqing University of Posts and Telecommunications, Student No. S130101158, dated Jun. 8, 2016, (82p).

Notice of Allowance of the counterpart CN application No. 202311306528.7 (Official mailing date: Feb. 26, 2024.

First Office Action issued in CN Application No. 202311365138.7 with English Translation, dated May 15, 2024, (7p).

\* cited by examiner

```
┌─────────────────────────────────────────────────────────┐
│ determining a signaling of merge modes for deriving motion │
│ information of a current block, wherein the merge modes comprise: │
│   regular merge mode, and extended merge modes   1202   │
└─────────────────────────────────────────────────────────┘
                              │
                              ▼
┌─────────────────────────────────────────────────────────┐
│ deriving motion information of the current block using the regular │
│ merge mode, upon determining that the signaling of merge modes │
│   comprises a positive signal of regular merge mode   1204 │
└─────────────────────────────────────────────────────────┘
```

FIG. 12

```
┌─────────────────────────────────────────────────────────┐
│ providing a signaling order of merge modes including a first group of merge modes │
│        and a second group of merge modes            1302 │
└─────────────────────────────────────────────────────────┘
                              │
                              ▼
┌─────────────────────────────────────────────────────────┐
│ deriving a variable indicating enablement status of at least one merge mode in the │
│              first group of merge modes             1304 │
└─────────────────────────────────────────────────────────┘
                              │
                              ▼
┌─────────────────────────────────────────────────────────┐
│ deriving motion information of a current block using a merge mode in the second │
│ group of merge modes, upon determining that the variable indicates that no merge │
│       mode in the first group of merge modes is enabled          1306 │
└─────────────────────────────────────────────────────────┘
                              │
                              ▼
┌─────────────────────────────────────────────────────────┐
│ determining a signaling of merge modes for deriving motion information of the │
│ current block, upon determining that the variable indicates that at least one merge │
│       mode in the first group of merge modes is enabled          1308 │
└─────────────────────────────────────────────────────────┘
                              │
                              ▼
┌─────────────────────────────────────────────────────────┐
│ signaling a given merge mode flag when determining that there is at least one other │
│ type of merge modes following the given merge mode in a signaling order and the at │
│     least one other type of merge modes is enabled for the current block    1310 │
└─────────────────────────────────────────────────────────┘
                              │
                              ▼
┌─────────────────────────────────────────────────────────┐
│ determining not to signal the given merge mode flag when determining that there is │
│ no other type of enabled merge modes following the given merge mode in the │
│           signaling order for the current block          1312 │
└─────────────────────────────────────────────────────────┘
                              │
                              ▼
┌─────────────────────────────────────────────────────────┐
│ inferring a value of the corresponding flag as opposite to explicitly signaled merge │
│ mode flags for the current block when determining that a certain merge mode is │
│      enabled but a corresponding flag is not signaled        1314 │
└─────────────────────────────────────────────────────────┘
```

FIG. 13 obtaining, by a decoder, a plurality of variables for determining enablement statuses of a plurality of merge modes in a second group of merge modes, wherein the second group of merge modes comprises a combined inter and intra prediction (CIIP) merge mode                                  1402 in response to determining, by the decoder, from the plurality of variables that no merge mode in the second group of merge modes is enabled, determining, by the decoder, information of merge modes for deriving motion information of a current block, wherein the information of merge modes comprises a flag indicating whether to apply a merge mode in a first group of merge modes, wherein the first group of merge modes comprises a regular merge mode, wherein the regular merge mode is signaled using Context-Adaptive Binary Arithmetic Coding (CABAC) with multiple context models and selection of the multiple context models is based on a skip flag of the current block                                  1404 in response to determining, by the decoder, from the plurality of variables that the plurality of merge modes in the second group of merge modes are enabled, determining, by the decoder, information of merge modes for deriving motion information of the current block, wherein the information of merge modes comprises a flag indicating whether to apply one of the plurality of enabled merge modes in the second group of merge modes                                  1406

FIG. 14

METHODS AND APPARATUSES FOR SIGNALING OF MERGE MODES IN VIDEO CODING

CROSS-REFERENCE TO RELATED APPLICATIONS

This application is a continuation of International Application No. PCT/US2020/027525, filed on Apr. 9, 2020, which claims priority to U.S. Provisional Application No. 62/831,716, entitled "The Signaling of Merge Modes for Video Coding," filed on Apr. 9, 2019, the disclosures of which are incorporated by reference in their entireties for all purposes.

FIELD

The present application generally relates to video coding and compression, and in particular but not limited to, methods and apparatuses for signaling of motion merge modes in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression. Digital video devices implement video coding techniques, such as those described in the standards defined by Versatile Video Coding (VVC), Joint Exploration Test Model (JEM), MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards.

Video coding generally utilizes prediction methods (e.g., inter-prediction, intra-prediction) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

In a Joint Video Experts Team (JVET) meeting, JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meetings.

SUMMARY

In general, this disclosure describes examples of techniques relating to signaling of motion merge modes for video coding.

According to a first aspect of the present disclosure, there is provided a method for video coding, including: determining a signaling of merge modes for deriving motion information of a current block, where the merge modes include: regular merge mode and extended merge modes; and deriving motion information of the current block using the regular merge mode, upon determining that the signaling of merge modes includes a positive signal of regular merge mode.

According to a second aspect of the present disclosure, there is provided a method for video coding, including: providing a signaling order of merge modes including a first group of merge modes and a second group of merge modes; deriving a variable indicating enablement status of at least one merge mode in the second group of merge modes; deriving motion information of a current block using a merge mode in the first group of merge modes, upon determining that the variable indicates that no merge mode in the second group of merge modes is enabled; and determining a signaling of merge modes for deriving motion information of the current block, upon determining that the variable indicates that at least one merge mode in the second group of merge modes is enabled.

According to a third aspect of the present disclosure, there is provided an apparatus for video coding, including: one or more processors; and a memory configured to store instructions executable by the one or more processors; where the one or more processors, upon execution of the instructions, are configured to: determine a signaling of merge modes for deriving motion information of a current block, where the merge modes include: regular merge mode and extended merge modes; and derive motion information of the current block using the regular merge mode, upon determining that the signaling of merge modes includes a positive signal of regular merge mode.

According to a fourth aspect of the present disclosure, there is provided an apparatus for video coding, including: one or more processors; and a memory configured to store instructions executable by the one or more processors; where the one or more processors, upon execution of the instructions, are configured to: provide a signaling order of merge modes including a first group of merge modes and a second group of merge modes; derive a variable indicating enablement status of at least one merge mode in the second group of merge modes; derive motion information of a current block using a merge mode in the first group of merge modes, upon determining that the variable indicates that no merge mode in the second group of merge modes is enabled; and determine a signaling of merge modes for deriving motion information of the current block, upon determining that the variable indicates that at least one merge mode in the second group of merge modes is enabled.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 12 is a flowchart illustrating an exemplary process of signaling of merge modes for video coding in accordance with some implementations of the present disclosure.

FIG. 13 is a flowchart illustrating another exemplary process of signaling of merge modes for video coding in accordance with some implementations of the present disclosure.

FIG. 14 is a flowchart illustrating how the regular merge mode or the combined inter and intra prediction (CIIP) merge mode is selected.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g., devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
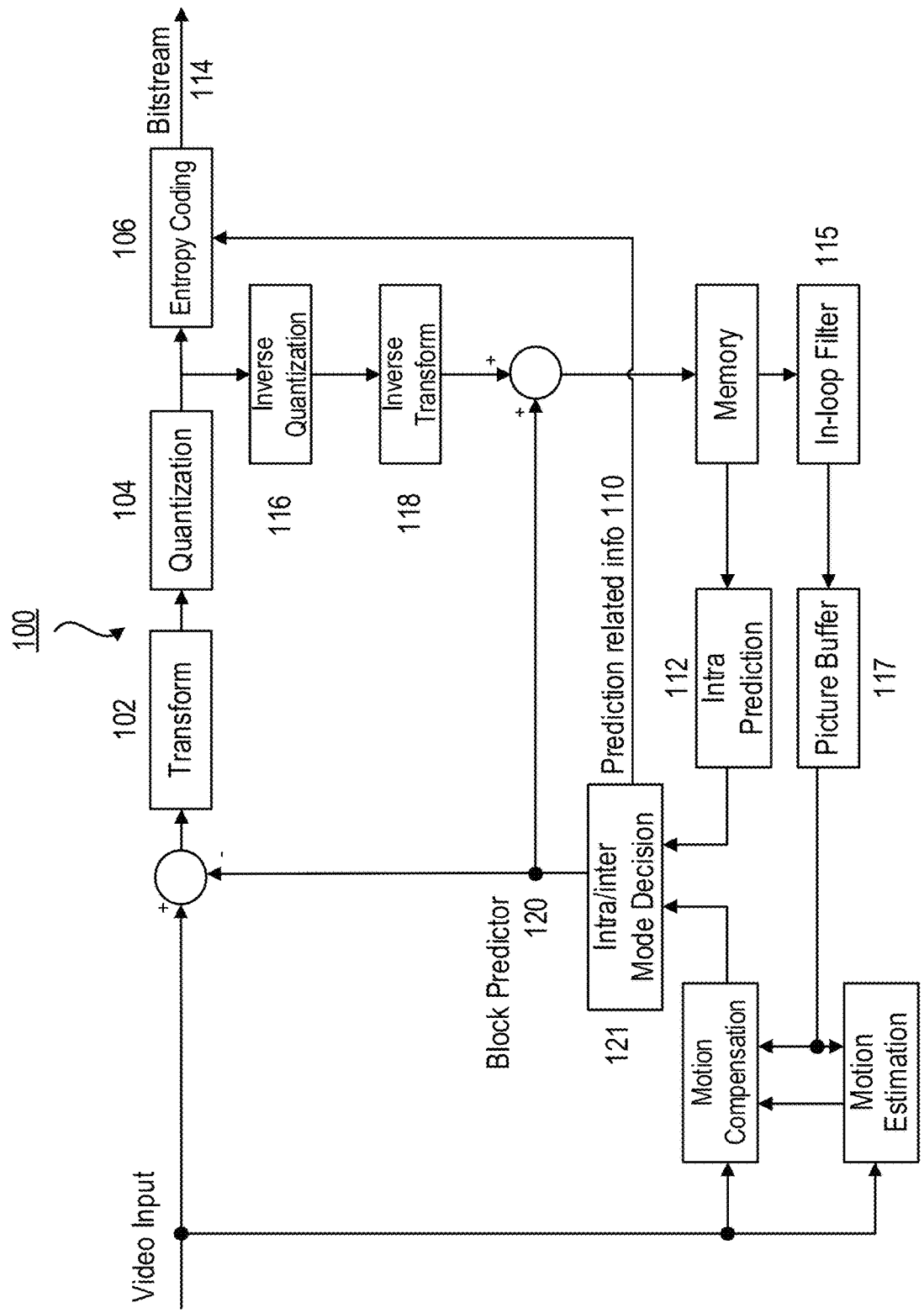
FIG. 1 is a block diagram illustrating an exemplary video encoder in accordance with some implementations of the present disclosure.

FIG. 1 shows a block diagram illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
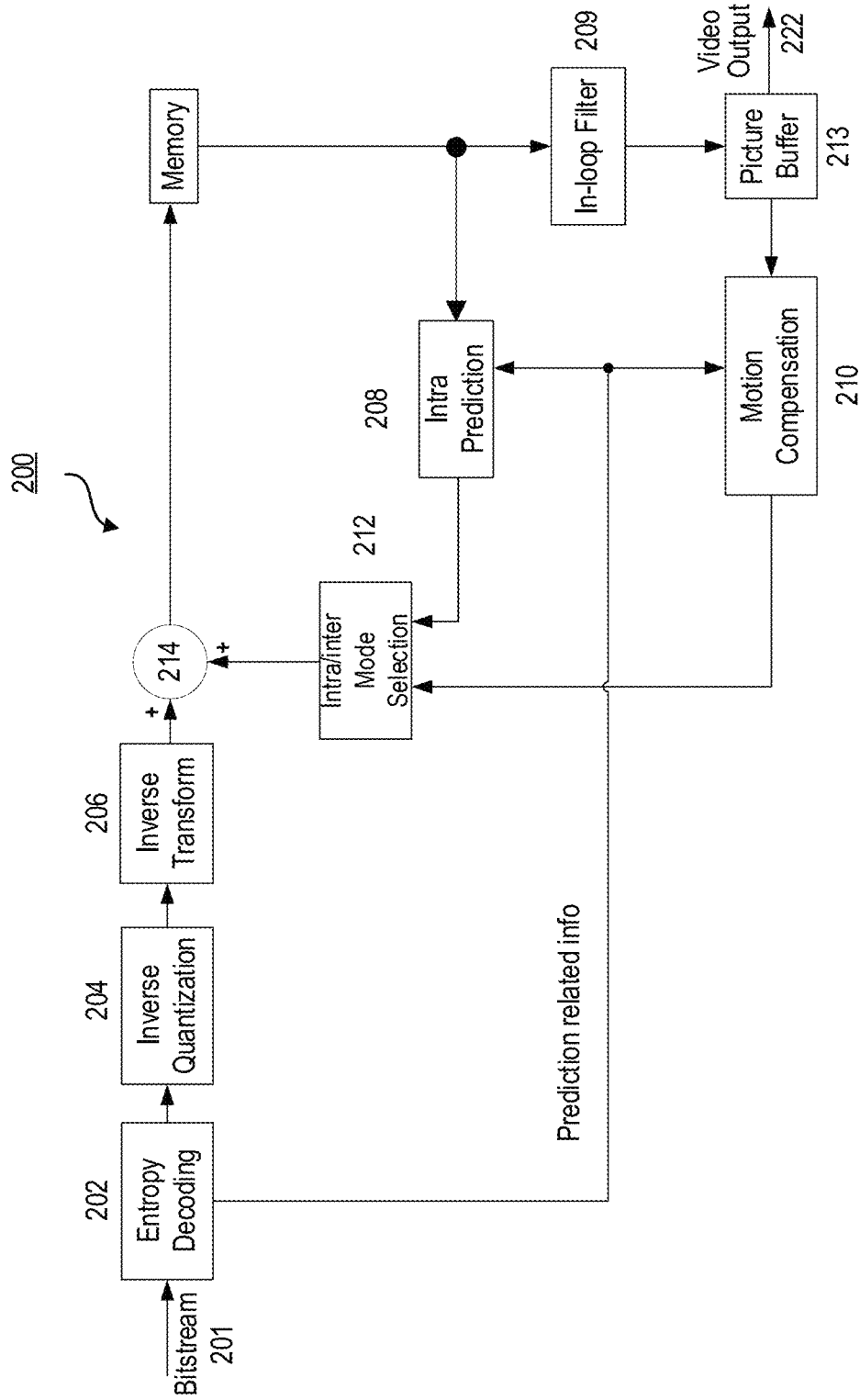
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Video coding/decoding standards mentioned above, such as VVC, JEM, HEVC, MPEG-4, Part 10, are conceptually similar. For example, they all use block-based processing. In a Joint Video Experts Team (JVET) meeting, the JVET defined the first draft of the Versatile Video Coding (VVC) and the VVC Test Model 1 (VTM1) encoding method. It was decided to include a quadtree with nested multi-type tree using binary and ternary splits coding block structure as the initial new coding feature of VVC.

In VVC, the picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g. intra or inter). In the disclosure, the term "unit" defines a region of an image covering all components; the term "block" is used to define a region covering a particular component (e.g. luma), and may differ in spatial location when considering the chroma sampling format such as 4:2:0.

Regular Merge Mode

In VVC Test Model 4 (VTM4), the merge candidate list is constructed by including five types of candidates in the following order:
1) Spatial motion vector predictor (MVP) from spatial neighboring CUs;
2) Temporal MVP from collocated CUs;
3) History-based MVP from a FIFO (First in First out) table;
4) Pairwise average MVP; and
5) Zero MVs.

The size of merge list is signaled in slice header and the maximum allowed size of merge list is 6 in VTM4. For each CU code in merge mode, an index of the best merge candidate is encoded using truncated unary binarization (TU). The first bin of the merge index is coded with context and bypass coding is used for other bins. In the following context of this disclosure, this merge mode is also called regular merge mode since this concept is the same as the merge mode used in HEVC.

Merge Mode with Motion Vector Differences (MMVD)

In addition to the regular merge mode, where the implicitly derived motion information is directly used for prediction samples generation of a current CU, the merge mode with motion vector differences (MMVD) is introduced in VVC. In some examples, an MMVD flag may be signaled right after sending a skip flag and merge flag to specify whether the MMVD is used for a CU.

Figure 3:
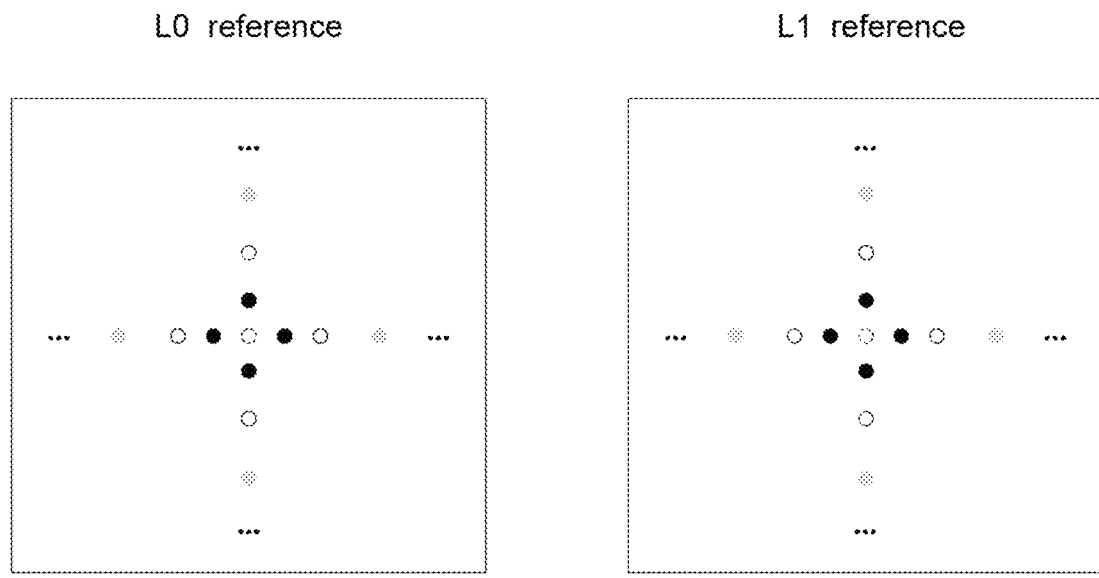
FIG. 3 is a schematic diagram illustrating merge mode with motion vector differences (MMVD) search points in accordance with some implementations of the present disclosure.

FIG. 3 is a schematic diagram illustrating merge mode with motion vector differences (MMVD) search points in accordance with some implementations of the present disclosure.

In the MMVD, after a merge candidate is selected, it is further refined by the signaled motion vector differences (MVDs) information. This information includes a merge candidate flag, an index (i.e., distance index) to specify motion magnitude, and an index (i.e., direction index) for indication of motion direction. In the MMVD, one of the first two candidates in the merge list is selected to be used as MV basis (or a starting point). The merge candidate flag is signaled to specify which one is used.

The distance index specifies motion magnitude information and indicates the pre-defined offset from the starting point. As shown in FIG. 3, an offset is added to either the horizontal component or the vertical component of the starting MV to obtain a MMVD search point. The relation between distance index and the pre-defined offset is specified in Table 1.

TABLE 1

Relation Between Distance Index and Pre-Defined Offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

The direction index represents the direction of the MVD relative to the starting point. The direction index may represent the four directions as shown in Table 2. The meaning of the MVD sign (e.g., + or −) may be different according to the information of the starting MV. When the starting MV is a uni-prediction MV or bi-prediction MVs with both MVs pointing to the same side of the current picture (i.e., the Picture Order Counts (POCs) of two references are both greater than the POC of the current picture, or are both less than the POC of the current picture), the sign in Table 2 specifies the sign of MV offset added to the starting MV. When the starting MV is bi-prediction MVs with the two MVs pointing to the different sides of the current picture (i.e., the POC of one reference is greater than the POC of the current picture, and the POC of the other reference is less than the POC of the current picture), the sign in Table 2 specifies the sign of MV offset added to the list 0 MV component of the starting MV and the sign for the list 1 MV has the opposite value.

TABLE 2

Sign of MV Offset Specified by Direction Index

| Direction IDX | 00 | 01 | 10 | 11 |
|---|---|---|---|---|
| x-axis | + | − | N/A | N/A |
| y-axis | N/A | N/A | + | − |

Affine Motion Compensated Prediction

Figure 4:
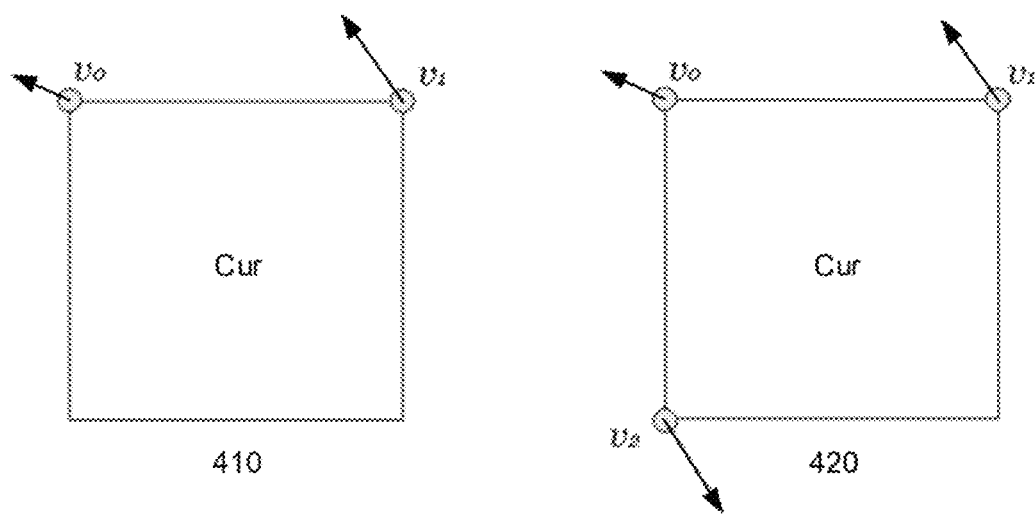
FIG. 4 is a schematic diagram illustrating examples of control point based affine motion models in accordance with some implementations of the present disclosure.

FIG. 4 is a schematic diagram illustrating examples of control point based affine motion models in accordance with some implementations of the present disclosure.

In HEVC, only translation motion model is applied for motion compensation prediction (MCP). However, in the real world, there are many kinds of motions, e.g. zoom in/out, rotation, perspective motions and other irregular motions. In VVC, in particular in VTM4, a block-based affine transform motion compensation prediction is applied. As shown in FIG. 4, the affine motion field of the block is described by motion information of two control point motion vectors (i.e., 4-parameter) or three control point motion vectors (i.e., 6-parameter).

For 4-parameter affine motion model 410, the motion vector at a sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (1)$$

For 6-parameter affine motion model 420, the motion vector at a sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

where ($mv_{0x}$, $mv_{0y}$) is the motion vector of the top-left corner control point, ($mv_{1x}$, $mv_{1y}$) is the motion vector of the top-right corner control point, and ($mv_{2x}$, $mv_{2y}$) is the motion vector of the bottom-left corner control point.

Figure 5:
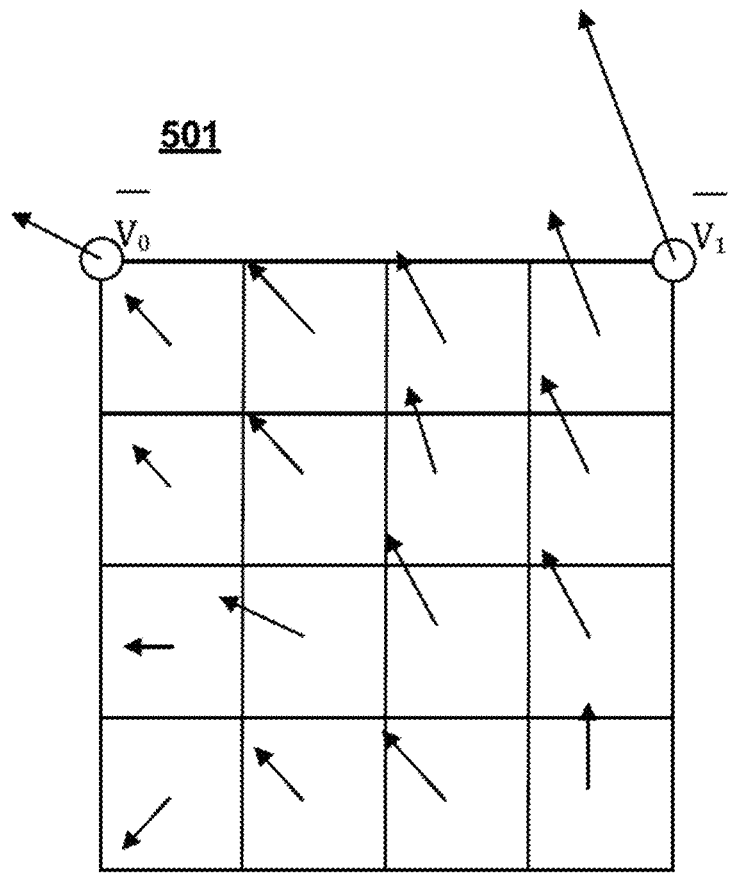
FIG. 5 is a schematic diagram illustrating an example of affine Motion Vector Field (MVF) per sub-block for a block in accordance with some implementations of the present disclosure.

FIG. 5 is a schematic diagram illustrating an affine Motion Vector Field (MVF) 501 per subblock for a block in accordance with some implementations of the present disclosure. In order to simplify the motion compensation prediction, block based affine transform prediction is applied. To derive the motion vector of each 4×4 luma subblock, the motion vector of the center sample of each subblock, as shown in FIG. 5, is calculated according to the above equations (1) and (2), and rounded to 1/16 fraction accuracy. Then, the motion compensation interpolation filters are applied to generate the prediction of each subblock with the derived motion vector. The subblock size of chroma-components may also be set to be 4×4. The motion vector (MV) of a 4×4 chroma subblock may be calculated as the average of the MVs of the four corresponding 4×4 luma subblocks.

Similar to translational motion inter prediction, there are also two affine motion inter prediction modes: affine merge mode and affine AMVP (advance motion vector prediction) mode.

The affine merge mode (AF_MERGE mode) may be applied for CUs with both width and height larger than or equal to 8. In this mode, the control point motion vectors (CPMVs) of the current CU are generated based on the motion information of the spatial neighboring CUs. There may be up to five CPMV predictor (CPMVP) candidates and an index is signaled to indicate the one to be used for the current CU. The following three types of CPMVP candidates are used to form the affine merge candidate list:

1) Inherited affine merge candidates that are extrapolated from the CPMVs of the neighboring CUs;
2) Constructed affine merge candidates that are derived using the translational MVs of the neighboring CUs; and
3) Zero MVs.

Figure 6:
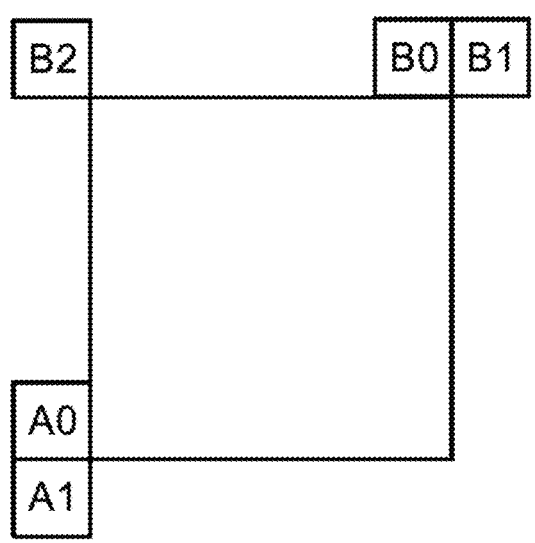
FIG. 6 is a schematic diagram illustrating locations of inherited affine motion predictors in accordance with some implementations of the present disclosure.

FIG. 6 is a schematic diagram illustrating locations of inherited affine motion predictors in accordance with some implementations of the present disclosure. In VTM4, there are maximum two inherited affine candidates, which are derived from affine motion model of the neighboring blocks, one from the left neighboring CUs and one from the above neighboring CUs. The candidate blocks of the current CU are shown in FIG. 6. For the left predictor, the scan order is A0→A1, and for the above predictor, the scan order is B0→B1→B2. Only the first inherited candidate from each side is selected. No pruning check is performed between the two inherited candidates.

Figure 7:
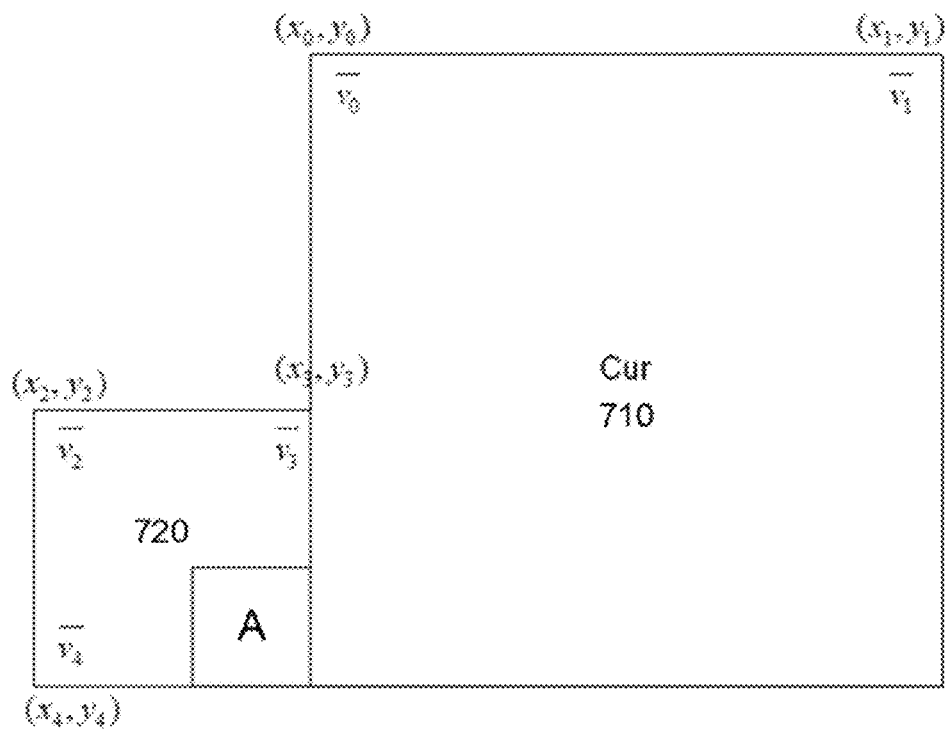
FIG. 7 is a schematic diagram illustrating control point motion vector inheritance in accordance with some implementations of the present disclosure.

FIG. 7 is a schematic diagram illustrating control point motion vector inheritance in accordance with some implementations of the present disclosure. When a neighboring affine CU 720 is identified, its control point motion vectors are used to derived the CPMVP candidate in the affine merge list of the current CU 710. As shown in FIG. 7, if the neighboring left bottom block A is coded in affine mode, the motion vectors $v_2$, $v_3$ and $v_4$ of the top left corner, above right corner and left bottom corner of the CU 720 which contains the block A are attained. When the block A is coded with the 4-parameter affine model, the two CPMVs of the current CU 710 are calculated according to $v_2$, and $v_3$. In the case that the block A is coded with the 6-parameter affine model, the three CPMVs of the current CU 710 are calculated according to $v_2$, $v_3$ and $v_4$.

Figure 8:
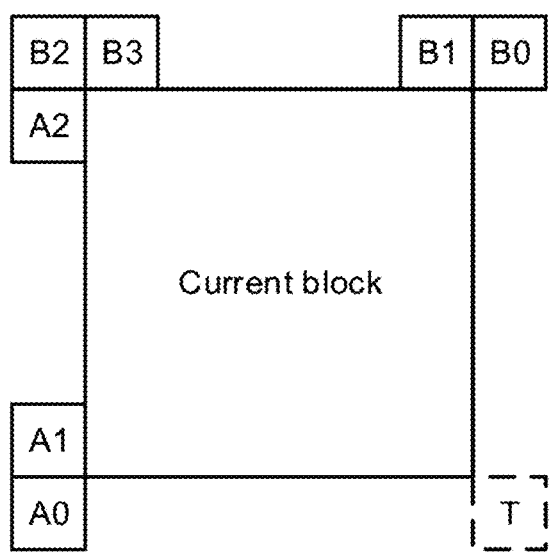
FIG. 8 is a schematic diagram illustrating locations of candidate positions for constructed affine merge mode candidate in accordance with some implementations of the present disclosure.

FIG. 8 is a schematic diagram illustrating locations of candidate positions for constructed affine merge mode candidate in accordance with some implementations of the present disclosure. A constructed affine candidate is constructed by combining the neighboring translational motion information of each control point. The motion information for the control points is derived from the specified spatial neighbors and temporal neighbor shown in FIG. 8. $CPMV_k$ (k=1, 2, 3, 4) represents the k-th control point of the current block 810. For $CPMV_1$, the B2→B3→A2 blocks are checked in order and the MV of the first available block is used. Likewise, $CPMV_2$ is derived by checking the B1→B0 blocks in order. $CPMV_3$ is derived by checking the A1→A0 blocks in order. The temporal motion vector predictor T is used as $CPMV_4$ if it is available.

After the MVs of the four control points are attained, affine merge candidates are constructed based on the motion information. The following combinations of control point MVs are used to construct in the order:

{$CPMV_1$, $CPMV_2$, $CPMV_3$},
{$CPMV_1$, $CPMV_2$, $CPMV_4$},
{$CPMV_1$, $CPMV_3$, $CPMV_4$},
{$CPMV_2$, $CPMV_3$, $CPMV_4$},
{$CPMV_1$, $CPMV_2$}, and
{$CPMV_1$, $CPMV_3$}.

The combination of 3 CPMVs constructs a 6-parameter affine merge candidate and the combination of 2 CPMVs constructs a 4-parameter affine merge candidate. To avoid motion scaling process, if the reference indices of the control points are different, the related combination of control point MVs is discarded.

After inherited affine merge candidates and constructed affine merge candidates are checked, if the affine merge candidate list is still not full, zero MVs are inserted to the end of the list.

Subblock-Based Temporal Motion Vector Prediction (SbTMVP)

The reference software VTM supports subblock-based temporal motion vector prediction (SbTMVP) method. In some examples, subblock merge mode or subblock based merge mode may include Subblock-based Temporal Motion Vector Prediction (SbTMVP) and Affine Merge Prediction (AMP) candidates. The SbTMVP process is illustrated in FIG. 9A and FIG. 9B.

Figure 9A:
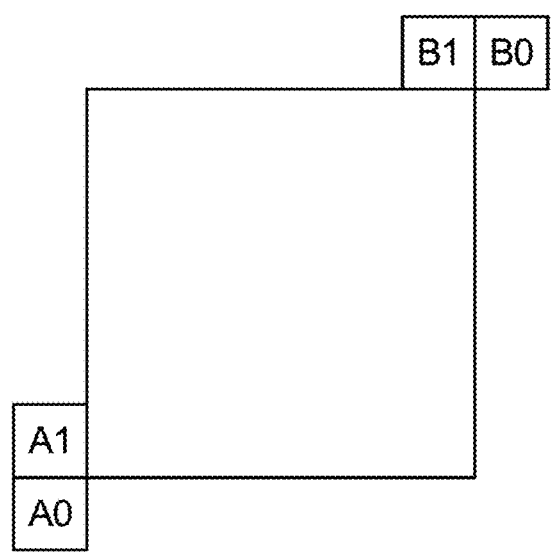
FIG. 9A is a schematic diagram illustrating spatial neighboring blocks used by subblock-based temporal motion vector prediction (SbTMVP) in accordance with some implementations of the present disclosure.

FIG. 9A is a schematic diagram illustrating spatial neighboring blocks used by subblock-based temporal motion vector prediction (SbTMVP) in accordance with some implementations of the present disclosure.

Figure 9B:
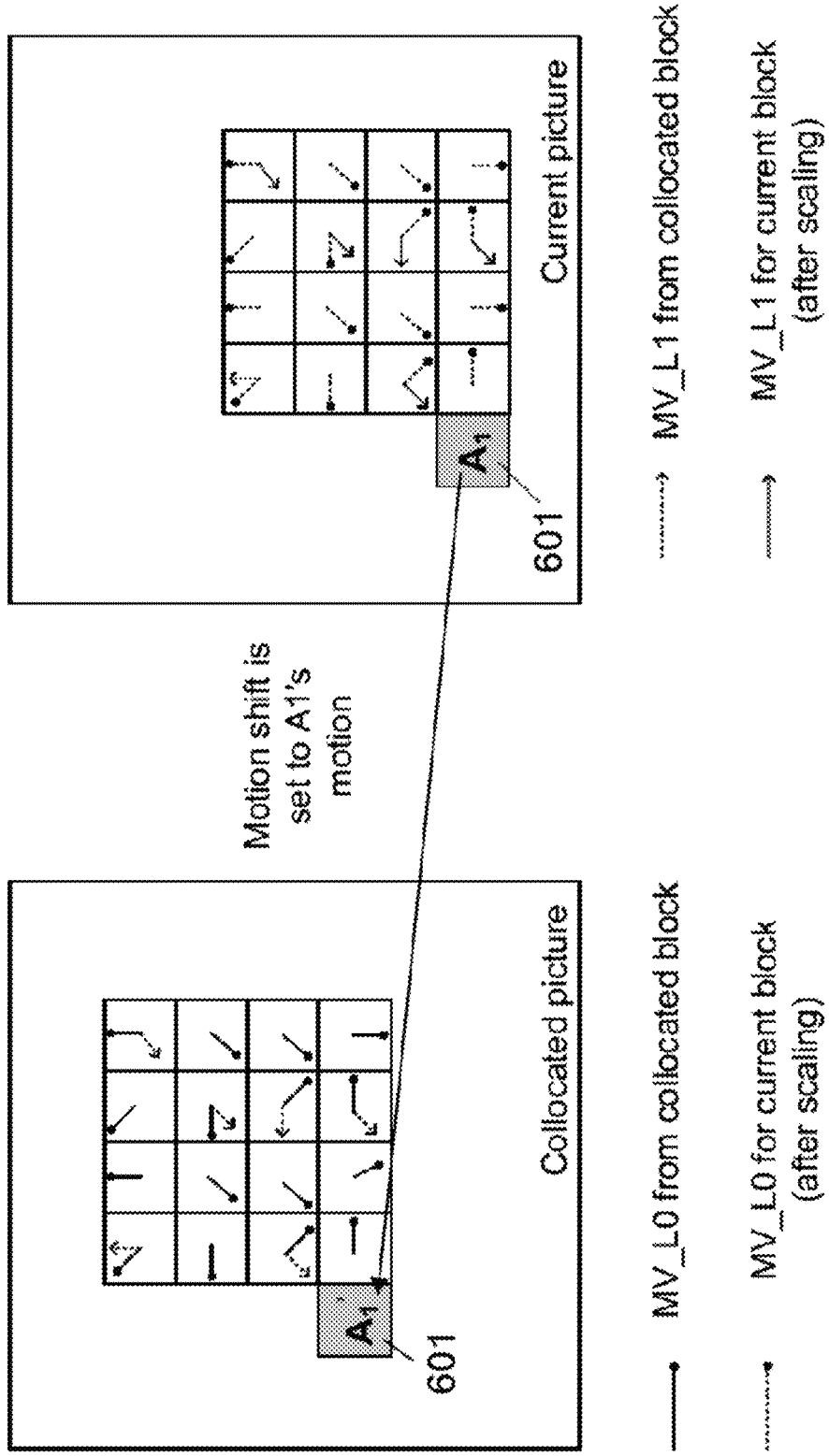
FIG. 9B is a schematic diagram illustrating a SbTMVP process of deriving sub-CU motion field in accordance with some implementations of the present disclosure.

FIG. 9B is a schematic diagram illustrating a SbTMVP process of deriving sub-CU motion field by applying a motion shift from a spatial neighbor and scaling motion information of corresponding collocated sub-CUs in accordance with some implementations of the present disclosure.

Similar to temporal motion vector prediction (TMVP) in HEVC, SbTMVP uses the motion field in the collocated picture to improve motion vector prediction and merge mode for CUs in the current picture. The same collocated picture used by TMVP is used for SbTMVP. The SbTMVP differs from the TMVP in the following two main aspects:

1) The TMVP predicts motion at CU level but the SbTMVP predicts motion at sub-CU level; and
2) Whereas the TMVP fetches the temporal motion vectors from the collocated block in the collocated picture (the collocated block is the bottom-right or center block relative to the current CU), the SbTMVP applies a motion shift before fetching the temporal motion information from the collocated picture, where the motion shift is obtained from the motion vector of one of the spatial neighboring blocks of the current CU.

The SbTMVP predicts the motion vectors of the sub-CUs within the current CU in two steps. In the first step, the spatial neighbors in FIG. 9A are examined in the following order of A1, B1, B0 and A0. As soon as the first spatial neighboring block having a motion vector that uses the collocated picture as its reference picture is identified, this motion vector is selected to be the motion shift to be applied. If no such motion is identified from the spatial neighbors, the motion shift is set to (0, 0).

In the second step, the motion shift identified in the first step is applied (i.e., added to the current block's coordinates) to obtain sub-CU-level motion information (e.g., motion vectors and reference indices) from the collocated picture as shown in FIG. 9B. The example in FIG. 9B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way to that of the TMVP process of HEVC, where temporal motion scaling is applied to align the reference pictures of the temporal motion vectors to those of the current CU.

In VTM4, a combined subblock based merge list which contains both SbTMVP candidate and affine merge candidates is used for the signaling of subblock based merge mode, which may be referred to as subblock merge mode or SbTMVP mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signaled in SPS and the maximum allowed size of the subblock based merge list is 5 in VTM4.

The sub-CU size used in SbTMVP is fixed to be 8×8, and similar to affine merge mode, the SbTMVP mode is only applicable to the CUs with both width and height larger than or equal to 8.

The encoding logic of the additional SbTMVP merge candidate is the same as for the other merge candidates, that is, for each CU in P or B slice, an additional RD check is performed to decide whether to use the SbTMVP candidate.

Combined Inter and Intra Prediction (CIIP)

In VTM4, when a CU is coded in merge mode, and if the CU contains at least 64 luma samples (that is, CU width times CU height is equal to or larger than 64), an additional flag is signaled to indicate if the combined inter/intra prediction (CIIP) mode is applied to the current CU.

In order to form the CIIP prediction, an intra prediction mode is first derived from two additional syntax elements. Up to four possible intra prediction modes may be used: DC, planar, horizontal, or vertical. Then, the inter prediction and intra prediction signals are derived using regular intra and inter decoding processes. Finally, weighted averaging of the inter and intra prediction signals is performed to obtain the CIIP prediction. It may be adopted to use only planar mode for CIIP to simplify the CIIP mode; for example, the intra prediction mode derivation as described in the following paragraphs may be removed for CIIP. Additionally, in some CIIP designs, the weights for intra and inter predicted samples are adaptively selected based on the number of neighboring intra-coded blocks. Specifically, the weights (wIntra, wInter) are adaptively set as follows. If both the top and left neighbors are intra-coded, (wIntra, wInter) are set equal to (3, 1). Otherwise, if one of these blocks is intra-coded, these weights are identical, i.e., (2, 2). If none of the blocks is intra-coded, the weights are set equal to (1, 3). In these CIIP designs, the weight derivation method as described in the following paragraphs may not be used.

In some examples, for the intra prediction mode derivation, up to 4 intra prediction modes, including DC, PLANAR, HORIZONTAL, and VERTICAL modes, can be used to predict the luma component in the CIIP mode. If the CU shape is very wide (that is, its width is more than twice its height), the HORIZONTAL mode is not allowed. If the CU shape is very narrow (that is, its height is more than twice its width), the VERTICAL mode is not allowed. In these cases, only 3 intra prediction modes are allowed.

The CIIP mode uses 3 most probable modes (MPMs) for intra prediction. The CIIP MPM candidate list is formed as follows:
  i. The left and top neighboring blocks are set as A and B, respectively;
  ii. The intra prediction modes of block A and block B, denoted as intraModeA and intraModeB, respectively, are derived as follows:
     a. Let X be either A or B;
     b. intraModeX is set to DC if 1) block X is not available; or 2) block X is not predicted using the CIIP mode or the intra mode; or 3) block B is outside of the current CTU;
     c. otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34);
  iii. If intraModeA and intraModeB are the same:
     a. If intraModeA is PLANAR or DC, then the three MPMs are set to {PLANAR, DC, VERTICAL} in that order;
     b. Otherwise, the three MPMs are set to {intraModeA, PLANAR, DC} in that order;
  iv. Otherwise (intraModeA and intraModeB are different):
     a. The first two MPMs are set to {intraModeA, intraModeB} in that order;
     b. Uniqueness of PLANAR, DC and VERTICAL is checked in that order against the first two MPM candidate modes; as soon as a unique mode is found, it is added to as the third MPM.

If the CU shape is very wide or very narrow as defined above, the MPM flag is inferred to be 1 without signaling. Otherwise, an MPM flag is signaled to indicate if the CIIP intra prediction mode is one of the CIIP MPM candidate modes.

If the MPM flag is 1, an MPM index is further signaled to indicate which one of the MPM candidate modes is used in CIIP intra prediction. Otherwise, if the MPM flag is 0, the intra prediction mode is set to the "missing" mode in the MPM candidate list. For example, if the PLANAR mode is not in the MPM candidate list, PLANAR is the missing mode, and the intra prediction mode is set to PLANAR. Since 4 possible intra prediction modes are allowed in CIIP, and the MPM candidate list contains only 3 intra prediction modes, one of the 4 possible modes must be the missing mode.

For the chroma components, the DM mode is always applied without additional signaling; that is, chroma uses the same prediction mode as luma for a CU.

The intra prediction mode of a CIIP-coded CU is saved and used in the intra mode coding of the future neighboring CUs.

To combine the inter and intra prediction signals, the inter prediction signal in the CIIP mode $P_{inter}$ is derived using the same inter prediction process applied to regular merge mode; and the intra prediction signal $P_{intra}$ is derived using the CIP intra prediction mode following the regular intra prediction process. Then, the intra and inter prediction signals are combined using weighted averaging. In some examples, the weight value depends on the intra prediction mode and where the sample is located in the coding block, as follows:

1) If the intra prediction mode is the DC or planar mode, or if the block width or height is smaller than 4, then equal weights are applied to the intra prediction and the inter prediction signals;
2) Otherwise, the weights are determined based on the intra prediction mode (either horizontal mode or vertical mode in this case) and the sample location in the block. Take the horizontal prediction mode for example (the weights for the vertical mode are derived similarly but in the orthogonal direction). Denote W as the width of the block and H as the height of the block. The coding block is first split into four equal-area parts, each of the dimension (W/4)×H. Starting from the part closest to the intra prediction reference samples and ending at the part farthest away from the intra prediction reference samples, the weight wt for each of the 4 regions is set to 6, 5, 3, and 2, respectively. The final CIIP prediction signal is derived using the following:

$$P_{CIIP}((8-wt)*P_{inter}+wt*P_{intra})>>3 \qquad (3)$$

Triangle Partition for Inter Prediction

In VTM4, a new triangle partition mode is introduced for inter prediction. The triangle partition mode (TPM) is only applied to CUs that are 8×8 or larger and are coded in skip or merge mode. For a CU satisfying these conditions with the merge flag on, a CU-level flag is signaled to indicate whether the triangle partition mode is applied or not. The triangle partition mode (TPM) may also be referred to as triangular merge mode.

Figure 10:
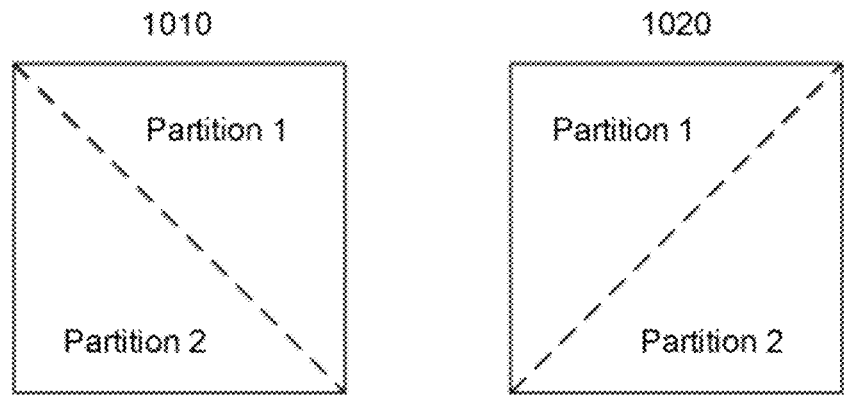
FIG. 10 is a schematic diagram illustrating examples of triangle partition based inter prediction in accordance with some implementations of the present disclosure.

FIG. 10 is a schematic diagram illustrating examples of triangle partition based inter prediction in accordance with some implementations of the present disclosure.

When the triangular merge mode is used, a CU is split evenly into two triangle-shaped partitions as shown in FIG. 10, using either the diagonal split 1010 or the anti-diagonal split 1020. Each triangle partition in the CU is inter-predicted using its own motion; and only uni-prediction is allowed for each partition, that is, each partition has one motion vector and one reference index. The uni-prediction motion constraint is applied to ensure that under triangle prediction mode, only two motion compensated predictions are needed for the CU, which is the same as the conventional bi-prediction.

If the CU-level flag indicates that the current CU is coded using the triangle partition mode, a flag is signaled to indicate the triangle partition direction (i.e., diagonal or anti-diagonal). Then, an index is signaled for each of the two partitions respectively to indicate the merge motion vector candidate that is used for each triangle partition. After predicting each of the triangle partitions, the sample values along the diagonal or anti-diagonal edge are adjusted using a blending processing with adaptive weights. After the prediction process, transform and quantization process is applied to the whole CU. It is worth mentioning that the motion field of a CU predicted using the triangle partition mode is stored in 4×4 units.

Context-Adaptive Binary Arithmetic Coding (CABAC)

Context-adaptive binary arithmetic coding (CABAC) is a form of entropy coding used in many video coding standards, e.g. H.264/MPEG-4 AVC, High Efficiency Video Coding (HEVC) and VVC. CABAC is based on arithmetic coding, with a few innovations and changes to adapt it to the needs of video coding standards:

i. It codes binary symbols, which keeps the complexity low and allows probability modelling for more frequently used bits of any symbol.
ii. The probability models are selected adaptively based on local context, allowing better modelling of probabilities, because coding modes are usually locally well correlated.
iii. It uses a multiplication-free range division by the use of quantized probability ranges and probability states.

CABAC has multiple probability modes for different contexts. It first converts all non-binary symbols to binary. Then, for each bin (or termed bit), the coder selects which probability model to use, and uses information from nearby elements to optimize the probability estimate. Arithmetic coding is finally applied to compress the data.

The context modeling provides estimates of conditional probabilities of the coding symbols. Utilizing suitable context models, a given inter-symbol redundancy can be exploited by switching between different probability models according to already-coded symbols in the neighborhood of the current symbol to encode.

Coding a data symbol involves the following stages:

i. Binarization: CABAC uses Binary Arithmetic Coding which means that only binary decisions (1 or 0) are encoded. A non-binary-valued symbol (e.g., a transform coefficient or motion vector) is "binarized" or converted into a binary code prior to arithmetic coding. This process is similar to the process of converting a data symbol into a variable length code but the binary code is further encoded (by the arithmetic coder) prior to transmission.
ii. Stages are repeated for each bin (or "bit") of the binarized symbol.
iii. Context model selection: A "context model" is a probability model for one or more bins of the binarized symbol. This model may be chosen from a selection of available models depending on the statistics of recently coded data symbols. The context model stores the probability of each bin being "1" or "0".
iv. Arithmetic encoding: An arithmetic coder encodes each bin according to the selected probability model. Note that there are just two sub-ranges for each bin (corresponding to "0" and "1").
v. Probability update: The selected context model is updated based on the actual coded value (e.g., if the bin value was "1", the frequency count of "1"s is increased).

In summary, the merge modes in VTM-4.0 are classified into five categories including the regular merge mode, merge mode with MVD (MMVD), subblock merge mode (containing affine merge and subblock-based temporal motion vector prediction), combined inter and intra prediction (CIIP) merge mode and triangle partition merge mode. The syntax of the merge mode signaling in the current VVC is illustrated in Table 3. The symbol ae(v) indicates a context-adaptive arithmetic entropy-coded syntax element.

TABLE 3

Syntax of merge related modes in current VVC

| | Descriptor |
|---|---|
| merge_data( x0, y0, cbWidth, cbHeight) { | |
|   mmvd_flag[ x0 ][ y0 ] | ae(v) |
|   if( mmvd_flag[ x0 ][ y0 ] = = 1) { | |
|     mmvd_merge_flag[ x0 ][ y0 ] | ae(v) |
|     mmvd_distance_idx[ x0 ][ y0 ] | ae(v) |
|     mmvd_direction_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1) { | |
|       if( MaxNumSubblockMergeCand > 1) | |
|         merge_subblock_idx[ x0 ][ y0 ] | ae(v) |
|     } else { | |
|       if( sps_mh_intra_enabled_flag && cu_skip_flag[ x0 ][ y0 ] = = 0 && ( cbWidth * cbHeight) >= 64 && cbWidth < 128 && cbHeight < 128) { | |
|         mh_intra_flag[ x0 ][ y0 ] | ae(v) |
|         if( mh_intra_flag[ x0 ][ y0 ] ) { | |
|           if ( cbWidth <= 2 * cbHeight || cbHeight <= 2 * cbWidth) | |
|             mh_intra_luma_mpm_flag[ x0 ][ y0 ] | ae(v) |
|           if( mh_intra_luma_mpm_flag[ x0 ][ y0 ] ) | |
|             mh_intra_luma_mpm_idx[ x0 ][ y0 ] | ae(v) |
|         } | |
|       } | |
|       if( sps_triangle_enabled_flag && slice_type = = B && cbWidth * cbHeight >= 16 ) | |
|         merge_triangle_flag[ x0 ][ y0 ] | ae(v) |
|       if( merge_triangle_flag[ x0 ][ y0 ] ) | |
|         merge_triangle_idx[ x0 ][ y0 ] | ae(v) |
|       else if( MaxNumMergeCand > 1 ) | |
|         merge_idx[ x0 ][ y0 ] | ae(v) |
|     } | |
|   } | |
| } | |

That is, in the current VVC, the syntax (the associated flags) signaled to indicate the corresponding merge modes is shown in Table 4.

TABLE 4

Signaling of the merge related modes in current VVC

| | MMVD Flag | Subblock Flag | CIIP Flag | Triangular Flag |
|---|---|---|---|---|
| MMVD | 1 | — | — | — |
| Subblock | 0 | 1 | — | — |
| CIIP | 0 | 0 | 1 | — |
| Triangle | 0 | 0 | 0 | 1 |
| Regular | 0 | 0 | 0 | 0 |

It is observed that more than 50% of the merge modes are the regular merge modes. However, in VTM-4.0, the codeword for the regular merge mode is the longest one among the five different merge modes (as shown in Table 4), which is not an efficient design in terms of syntax parsing. In the current VVC, the skip modes have a similar syntax design to the merge modes except that there is no CIIP mode for skip. And the same problem is observed in skip modes. Several methods are proposed to improve the efficiency of the syntax signaling of merge related modes. The methods may be applied independently or jointly.

In some examples, it is proposed to signal an explicit flag for the regular merge mode to indicate whether the regular merge mode is used or not. As shown in the examples of Table 5 and Table 6 below, one Regular flag (which may be termed Regular merge flag) is explicitly signaled into the bitstream and all the signaling of the related flags is modified accordingly. The regular merge flag is context coded using the CABAC. In one scheme, only one context is used to code the regular merge flag. In yet another scheme, multiple context models are used to code the regular merge flag and the selection of the context model is based on the coded information such as the regular merge flags of the neighboring blocks, the size of current CU, or the skip flag of current CU.

TABLE 5

An example of signaling of the merge related modes

| | Regular Flag | MMVD Flag | Subblock Flag | CIIP Flag |
|---|---|---|---|---|
| Regular | 1 | — | — | — |
| MMVD | 0 | 1 | — | — |
| Subblock | 0 | 0 | 1 | — |
| CIIP | 0 | 0 | 0 | 1 |
| Triangle | 0 | 0 | 0 | 0 |

TABLE 6

An example of signaling of
the skip related modes

|  | Regular Flag | MMVD Flag | Subblock Flag |
|---|---|---|---|
| Regular | 1 | — | — |
| MMVD | 0 | 1 | — |
| Subblock | 0 | 0 | 1 |
| Triangle | 0 | 0 | 0 |

In the example shown in Table 5, if the Regular flag is signaled as 1 (i.e., the signaling of merge mode includes a positive signal of regular merge mode), it indicates that the regular merge mode is used and the motion information of the current block is derived using the regular merge mode. If the Regular flag is signaled as 0 (i.e., the signaling of merge modes does not include the positive signal of regular merge mode), it indicates that other merge modes are used. Depending on the value(s) of the other merge mode flag(s), one of these other merge modes including the MMVD, subblock, CIIP, and triangular merge modes may be indicated for deriving motion information of the current block. For example, if the MMVD Flag is positively signaled, it indicates that the motion information of the current block is derived using the MMVD.

In current VVC, the constraints and/or conditions for enabling each different merge related modes are different, which are summarized in Table 7 below. Moreover, a flag is signaled in sequence parameter set (SPS) to indicate the on/off of each merge mode including MMVD, subblock (contains affine and subblock TMVP), CIIP and triangle modes. Thus, a variable indicating enablement status of the merge modes may be derived.

TABLE 7

Constrains of enabling or signaling
the merge/skip related modes

|  | constraints |
|---|---|
| Regular | no constraints |
| MMVD | no constraints |
| Subblock | block width >=8 and block height >=8 |
| CIIP | (block width × block height) >=64 && block width !=128 && block height !=128 && cu_skip_flag == 0 |
| Triangle | (block width × block height) >=64 |

Table 5 and Table 6 show the binarization codewords, assuming all the merge related modes are available (i.e., enabled). However, with the constraints on merge mode enabling illustrated above, there are cases where only a subset, but not all, of the merge related modes is available. That is, a particular merge mode may not be allowed or enabled as a mode option. In such cases, the corresponding codeword binarization may also be adjusted accordingly to improve coding efficiency. For example, under certain cases where only the regular merge mode and the MMVD mode are enabled for a given CU, only one bin needs to be signaled to indicate which of the two merge modes is used for the given CU, as shown in Table 8. In such cases, there is no need to signal flags such as MMVD, Subblock or CIIP flags.

TABLE 8

A special case of merge mode signaling

|  | Regular Flag | MMVD Flag | Subblock Flag | CIIP Flag |
|---|---|---|---|---|
| Regular | 1 | — | — | — |
| MMVD | 0 | — | — | — |

There are other examples where only a subset of the merge related modes is available due to the constraints on merge mode enabling. Whenever there is only a subset of the merge related modes available, the corresponding codeword binarization may be adjusted accordingly to save signaling overhead.

According to the disclosure, the necessity of signaling each of the different merge mode flags may be adjusted accordingly depending on the enabling/disabling status (or enablement status) of each merge mode. More specifically, based on an order of signaling, (e.g., the signaling order may be Regular merge flag→MMVD flag→Subblcok flag→CIIP flag), a given merge mode flag is signaled only if there is at least one other type of merge modes following the given merge mode in the signaling order and the at least one other type of merge modes is also allowed (i.e., enabled as a mode option) for the current CU. Based on this concept, an exemplary signaling method is provided. Taking the above signaling order as an example, the Subblock flag may not be signaled if the CIIP and triangular merge modes are not enabled.

The abovementioned signaling order is an example only, and other signaling order may be possible.

In some examples, in the case that a certain merge mode is allowed (enabled) but the corresponding flag is not signaled as illustrated above, the value of the corresponding flag may be inferred or derived. If the explicitly signaled merge mode flags for the current CU are all false, the value of the corresponding flag is inferred as true. Otherwise, the value is inferred as false. In the example shown in Table 8 where the MMVD mode is allowed but the MMVD flag is not signaled, the value of MMVD flag is inferred as true (or 1) if the signaled Regular flag is 0. Otherwise, the value of MMVD flag is inferred as false (or 0).

Table 9 is a syntax table illustrating an example of syntax of the merge mode signaling according to the disclosure. In the example, the values of four Boolean variables MMVDAllowed, MergeSubblockAllowed, MergeCIIPAllowed and MergeTriangleAllowed are first derived, specifying whether each mode is respectively allowed for a current coding block, according to the following:
  i. MMVDAllowed=sps_MMVD_enabled_flag;
  ii. MergeSubblockAllowed=(sps_affine_enabled_flag||sps_sbtmvp_enabled_flag) && block width>=8 && block height>=8;
  iii. MergeCIIPAllowed=sps_ciip_enabled_flag && current coding block is not coded as skip mode && (block width×block height)>=64 && block width!=128 && block height!=128;
  iv. MergeTriangleAllowed=sps_triangle_enabled_flag && (block width×block height)>=64.

In the above expressions, symbols "||" and "&&" respectively represent logical OR and AND operations. It is worth noting that the conditions listed above for each Boolean variable are corresponding to the current VVC. In the future if the associated constraints for a certain merge mode are changed, the corresponding equation or expression may be updated accordingly and the methods described in the disclosure are still applicable. The Boolean variables are used to determine whether each merge mode flag needs to be signaled as illustrated in Table 9. In this syntax table, the bold variables represent the signaled syntaxes. The symbol ae(v) indicates a context-adaptive arithmetic entropy-coded syntax element.

TABLE 9

Syntax of merge related modes in one example

|  | Descriptor |
|---|---|
| merge_data( x0, y0, cbWidth, cbHeight ) { | |
|   if ( CuPredMode[ x0 ][ y0 ] = = MODE_IBC) { | |
|     if( MaxNumMergeCand > 1) | |
|       merge_idx[ x0 ][ y0 ] | ae(v) |
|   } else { | |
|     if(MMVDAllowed \|\| Merge SubblockAllowed \|\| MergeCIIPAllowed \|\| MergeTriangleAllowed) | |
|       regular_merge_flag[ x0 ][ y0 ] | ae(v) |
|     if (regular_merge_flag[ x0 ][ y0 ]==1 ){ | |
|       if( MaxNumMergeCand > 1) | |
|         merge_idx[ x0 ][ y0 ] | ae(v) |
|     }else{ | |
|       if(MMVDAllowed && (MergeSubblockAllowed \|\| MergeCIIPAllowed \|\| MergeTriangleAllowed)) | |
|         mmvd_flag[ x0 ][ y0 ] | |
|       Else | ae(v) |
|         mmvd_flag[ x0 ][ y0 ] = MMVDAllowed && !regular_merge_flag[ x0 ][ y0 ] | |
|     if( mmvd_flag[ x0 ][ y0 ] = = 1) { | |
|       mmvd_merge_flag[ x0 ][ y0 ] | ae(v) |
|       mmvd_distance_idx[ x0 ][ y0 ] | ae(v) |
|       mmvd_direction_idx[ x0 ][ y0 ] | ae(v) |
|     } else { | |
|       if(MergeSubblockAllowed && (MergeCIIPAllowed \|\| MergeTriangleAllowed)) | |
|         merge_subblock_flag[ x0 ][ y0 ] | ae(v) |
|         else | |
|           merge_subblock_flag[ x0 ][ y0 ] = Merge SubblockAllowed && !regular_merge_flag[ x0 ][ y0 ] && !mmvd_flag[ x0 ][ y0 ] | |
|     if( merge_subblock_flag[ x0 ][ y0 ] = = 1) { | |
|       if( MaxNumSubblockMergeCand > 1 ) | |
|         merge_subblock_idx[ x0 ][ y0 ] | ae(v) |
|     } else { | |
|       if(MergeCIIPAllowed && MergeTriangleAllowed) | |
|         ciip_flag[ x0 ][ y0 ] | ae(v) |
|         else | |
|           ciip_flag[ x0 ][ y0 ] = MergeCIIPAllowed && !regular_merge_flag[ x0 ][ y0 ] && !mmvd_flag[ x0 ][ y0 ] &&!merge_subblock_flag[ x0 ][ y0 ] | |
|     if( ciip_flag[ x0 ][ y0 ] ) { | |
|       if ( cbWidth <= 2 * cbHeight \|\| cbHeight <= 2 * cbWidth) | |
|         ciip_luma_mpm_flag[ x0 ][ y0 ] | ae(v) |
|       if( ciip_luma_mpm_flag[ x0 ][ y0 ] ) | |
|         ciip_luma_mpm_idx[ x0 ][ y0 ] | ae(v) |
|       if( MaxNumMergeCand > 1) | |
|         merge_idx[ x0 ][ y0 ] | ae(v) |
|     } | |
|     } | |
|       merge_triangle_flag[ x0 ][ y0 ] = MergeTriangleAllowed && !regular_merge_flag[ x0 ][ y0 ] && !mmvd_fla[ x0 ][ y0 ] && !merge_subblock_flag[ x0 ][ y0 ] && ! ciip_flag[ x0 ][ y0 ] | |
|     if( merge_triangle_flag[ x0 ][ y0 ] ) { | |
|       merge_triangle_split_dir[ x0 ][ y0 ] | ae(v) |
|       merge_triangle_idx0[ x0 ][ y0 ] | ae(v) |
|       merge_triangle_idx1[ x0 ][ y0 ] | ae(v) |
|     } | |
|     } | |
|     } | |
|   } | |
| } | |

In some examples, the different merge modes may be considered in groups. For example, a first group of merge modes may include the regular merge mode, and a second group of merge modes may include the CIIP merge mode and the triangular merge mode (TPM). Alternatively, or additionally, the subblock based merge mode may be considered as a third group. A signaling order may be provided based on the groups of merge modes. The groups of merge modes may be in any predefined order according to different implementations.

In one example, the first group may be listed prior to the second group in the signaling order, and then the regular merge mode flag may be signaled only if there is at least one merge mode in the second group of merge modes that is allowed or enabled as a mode option, i.e., either one or both of CIIP and TPM are allowed.

Figure 11:
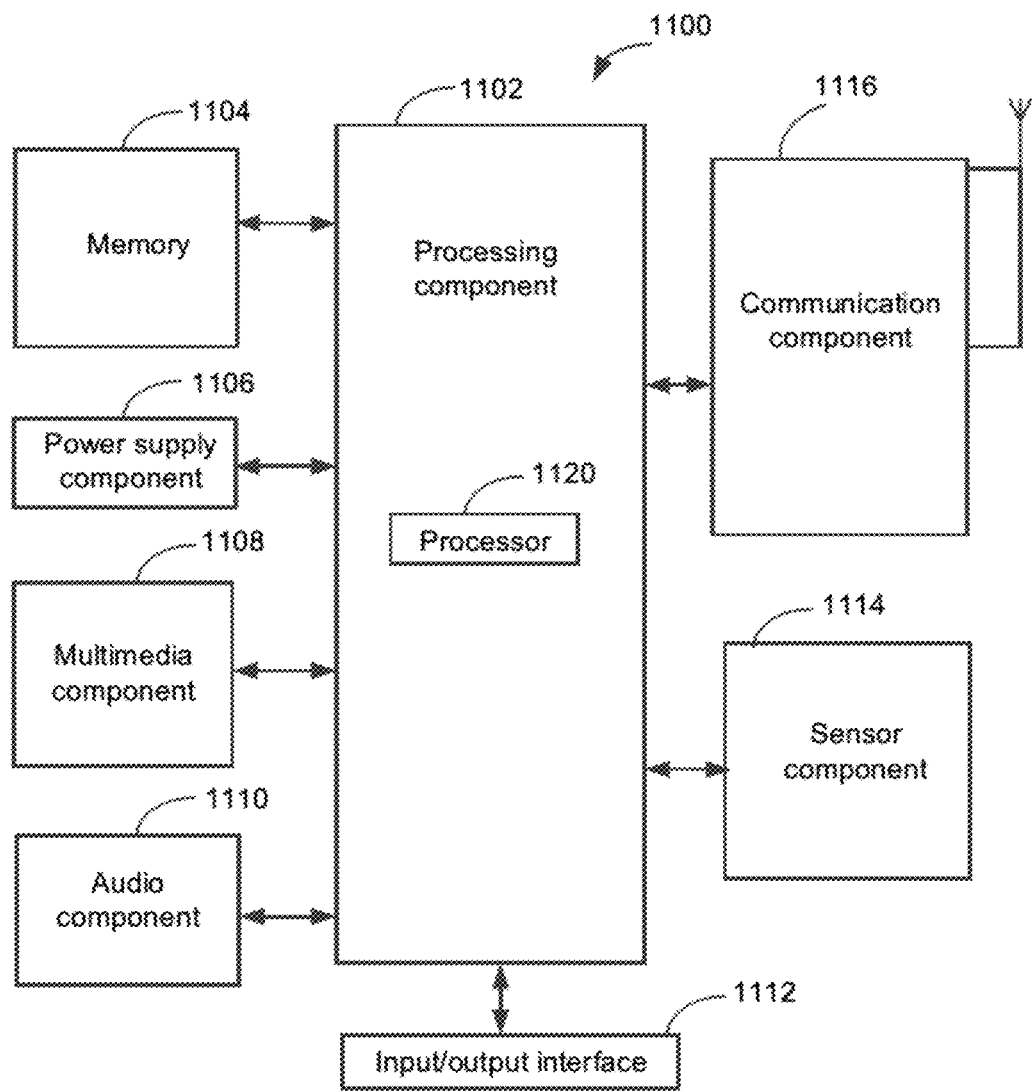
FIG. 11 is a block diagram illustrating an exemplary apparatus for video coding in accordance with some implementations of the present disclosure.

FIG. 11 is a block diagram illustrating an apparatus for video coding in accordance with some implementations of the present disclosure. The apparatus 1100 may be a terminal, such as a mobile phone, a tablet computer, a digital broadcast terminal, a tablet device, or a personal digital assistant.

As shown in FIG. 11, the apparatus 1100 may include one or more of the following components: a processing component 1102, a memory 1104, a power supply component 1106, a multimedia component 1108, an audio component 1110, an input/output (I/O) interface 1112, a sensor component 1114, and a communication component 1116.

The processing component 1102 usually controls overall operations of the apparatus 1100, such as operations relating to display, a telephone call, data communication, a camera operation and a recording operation. The processing component 1102 may include one or more processors 1120 for executing instructions to complete all or a part of steps of the above method. Further, the processing component 1102 may include one or more modules to facilitate interaction between the processing component 1102 and other components. For example, the processing component 1102 may include a multimedia module to facilitate the interaction between the multimedia component 1108 and the processing component 1102.

The memory 1104 is configured to store different types of data to support operations of the apparatus 1100. Examples of such data include instructions, contact data, phonebook data, messages, pictures, videos, and so on for any application or method that operates on the apparatus 1100. The memory 1104 may be implemented by any type of volatile or non-volatile storage devices or a combination thereof, and the memory 1104 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1106 supplies power for different components of the apparatus 1100. The power supply component 1106 may include a power supply management system, one or more power supplies, and other components associated with generating, managing and distributing power for the apparatus 1100.

The multimedia component 1108 includes a screen providing an output interface between the apparatus 1100 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1108 may include a front camera and/or a rear camera. When the apparatus 1100 is in an operation mode, such as a shooting mode or a video mode, the front camera and/or the rear camera may receive external multimedia data.

The audio component 1110 is configured to output and/or input an audio signal. For example, the audio component 1110 includes a microphone (MIC). When the apparatus 1100 is in an operating mode, such as a call mode, a recording mode and a voice recognition mode, the microphone is configured to receive an external audio signal. The received audio signal may be further stored in the memory 1104 or sent via the communication component 1116. In some examples, the audio component 1110 further includes a speaker for outputting an audio signal.

The I/O interface 1112 provides an interface between the processing component 1102 and a peripheral interface module. The above peripheral interface module may be a keyboard, a click wheel, a button, or the like. These buttons may include but not limited to, a home button, a volume button, a start button and a lock button.

The sensor component 1114 includes one or more sensors for providing a state assessment in different aspects for the apparatus 1100. For example, the sensor component 1114 may detect an on/off state of the apparatus 1100 and relative locations of components. For example, the components are a display and a keypad of the apparatus 1100. The sensor component 1114 may also detect a position change of the apparatus 1100 or a component of the apparatus 1100, presence or absence of a contact of a user on the apparatus 1100, an orientation or acceleration/deceleration of the apparatus 1100, and a temperature change of apparatus 1100. The sensor component 1114 may include a proximity sensor configured to detect presence of a nearby object without any physical touch. The sensor component 1114 may further include an optical sensor, such as a CMOS or CCD image sensor used in an imaging application. In some examples, the sensor component 1114 may further include an acceleration sensor, a gyroscope sensor, a magnetic sensor, a pressure sensor, or a temperature sensor.

The communication component 1116 is configured to facilitate wired or wireless communication between the apparatus 1100 and other devices. The apparatus 1100 may access a wireless network based on a communication standard, such as WiFi, 4G, or a combination thereof. In an example, the communication component 1116 receives a broadcast signal or broadcast related information from an external broadcast management system via a broadcast channel. In an example, the communication component 1116 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1100 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

FIG. 12 is a flowchart illustrating an exemplary process of signaling of merge modes for video coding in accordance with some implementations of the present disclosure.

In step 1202, the processor 1120 determines a signaling of merge modes for deriving motion information of a current block, where the merge modes include: regular merge mode and extended merge modes.

In step 1204, the processor 1120 derives motion information of the current block using the regular merge mode, upon determining that the signaling of merge modes includes a positive signal of regular merge mode.

The extended merge modes may include merge mode with motion vector differences (MMVD), subblock merge mode, combined inter and intra prediction (CIIP) merge mode, and triangular merge mode.

FIG. 13 is a flowchart illustrating another exemplary process of signaling of merge modes for video coding in accordance with some implementations of the present disclosure.

In step 1302, the processor 1120 provides a signaling order of merge modes including a first group of merge modes and a second group of merge modes.

In step 1304, the processor 1120 derives a variable indicating enablement status of at least one merge mode in the second group of merge modes.

In step 1306, the processor 1120 derives motion information of a current block using a merge mode in the first group of merge modes, upon determining that the variable indicates that no merge mode in the second group of merge modes is enabled.

In step 1308, the processor 1120 determines a signaling of merge modes for deriving motion information of the current block, upon determining that the variable indicates that at least one merge mode in the second group of merge modes is enabled.

In step 1310, the processor 1120 signals a given merge mode flag in response to determining that there is at least one other type of merge modes following the given merge mode in a signaling order and the at least one other type of merge modes is enabled for the current block.

In step 1312, the processor 1120 determines not to signal the given merge mode flag in response to determining that there is no other type of enabled merge modes following the given merge mode in the signaling order for the current block.

In step 1314, the processor 1120 infers a value of the corresponding flag as opposite to explicitly signaled merge mode flags for the current block in response to determining that a certain merge mode is enabled but a corresponding flag is not signaled.

In some examples, there is provided an apparatus for video coding. The apparatus includes one or more processors 1120; and a memory 1104 configured to store instructions executable by the one or more processors; where the processor, upon execution of the instructions, is configured to perform a method as illustrated in FIG. 12 or FIG. 13.

In some other examples, there is provided a non-transitory computer readable storage medium 1104, having instructions stored therein. When the instructions are executed by one or more processors 1120, the instructions cause the processor to perform a method as illustrated in FIG. 12 or FIG. 13.

FIG. 14 is a flowchart illustrating another exemplary process for video decoding in accordance with some implementations of the present disclosure.

In step 1402, a decoder obtains a plurality of variables for determining enablement statuses of a plurality of merge modes in a second group of merge modes. The second group of merge modes comprises a combined inter and intra prediction (CIIP) merge mode.

In step 1404, in response to determining from the plurality of variables that no merge mode in the second group of merge modes is enabled, the decoder determines information of merge modes for deriving motion information of a current block. The information of merge modes comprises a flag indicating whether to apply a merge mode in a first group of merge modes. The first group of merge modes comprises a regular merge mode. In some examples, the regular merge mode is signaled using Context-Adaptive Binary Arithmetic Coding (CABAC) with multiple context models and selection of the multiple context models is based on a skip flag of the current block.

In step 1406, in response to determining from the plurality of variables that the plurality of merge modes in the second group of merge modes are enabled, the decoder determines information of merge modes for deriving motion information of the current block. The information of merge modes comprises a flag indicating whether to apply one of the plurality of enabled merge modes in the second group of merge modes.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
   obtaining, by a decoder, a plurality of variables for determining enablement statuses of a plurality of merge modes in a second group of merge modes;
   in response to determining, by the decoder, from the plurality of variables that no merge mode in the second group of merge modes is enabled, determining, by the decoder, information of merge modes for deriving motion information of a current block, wherein the information of merge modes comprises a flag indicating whether to apply a merge mode in a first group of merge modes;
   in response to determining, by the decoder, that a certain merge mode is enabled but a corresponding flag is not signaled, inferring, by the decoder, a value of the corresponding flag as opposite to an explicitly signaled merge mode flag for the current block; and
   in response to determining, by the decoder, from the plurality of variables that a plurality of merge modes in the second group of merge modes are enabled, determining, by the decoder, information of merge modes for deriving motion information of the current block, wherein the information of merge modes comprises a flag indicating whether to apply one of the plurality of enabled merge modes in the second group of merge modes, wherein the first group of merge modes comprises a regular merge mode, and the second group of merge modes comprises a combined inter and intra prediction (CIIP) merge mode.

2. The method of claim 1, further comprising:

in response to determining, by the decoder, that the information of merge modes comprises a flag indicating application of a merge mode in the first group of merge modes, deriving, by the decoder, motion information of the current block using a merge mode in the first group of merge modes.

3. The method of claim 1, further comprising:

in response to determining, by the decoder, that the information of merge modes comprises a flag indicating non-application of a merge mode in the first group of merge modes, deriving, by the decoder, motion information of the current block using a merge mode in the second group of merge modes.

4. The method of claim 1, wherein the flag indicating whether to apply one of the plurality of enabled merge modes in the second group of merge modes is derived according to a sequence parameter set (SPS) flag, and size constraints of the one of the plurality of enabled merge modes.

5. The method of claim 1, wherein the regular merge mode is signaled using Context-Adaptive Binary Arithmetic Coding (CABAC) with multiple context models and selection of the multiple context models is based on a skip flag of the current block.

6. An apparatus for video decoding, comprising:

one or more processors; and a memory configured to store instructions executable by the one or more processors;

wherein the one or more processors, upon execution of the instructions, are configured to:

obtain a plurality of variables for determining enablement statuses of a plurality of merge modes in a second group of merge modes;

in response to determining from the plurality of variables that no merge mode in the second group of merge modes is enabled, determine information of merge modes for deriving motion information of a current block, wherein the information of merge modes comprises a flag indicating whether to apply a merge mode in a first group of merge modes;

in response to determining that a certain merge mode is enabled but a corresponding flag is not signaled, infer a value of the corresponding flag as opposite to an explicitly signaled merge mode flag for the current block; and in response to determining from the plurality of variables that a plurality of merge modes in the second group of merge modes are enabled, determine information of merge modes for deriving motion information of the current block, wherein the information of merge modes comprises a flag indicating whether to apply one of the plurality of enabled merge modes in the second group of merge modes, wherein the first group of merge modes comprises a regular merge mode, and the second group of merge modes comprises a combined inter and intra prediction (CIIP) merge mode.

7. The apparatus of claim 6, wherein the one or more processors are further configured to:

in response to determining that the information of merge modes comprises a flag indicating application of a merge mode in the first group of merge modes, derive motion information of the current block using a merge mode in the first group of merge modes.

8. The apparatus of claim 6, wherein the one or more processors are further configured to:

in response to determining that the information of merge modes comprises a flag indicating non-application of a merge mode in the first group of merge modes, derive motion information of the current block using a merge mode in the second group of merge modes.

9. The apparatus of claim 6, wherein the flag indicating whether to apply one of the plurality of enabled merge modes in the second group of merge modes is derived according to a sequence parameter set (SPS) flag, and size constraints of the one of the plurality of enabled merge modes.

10. The apparatus of claim 6, wherein the regular merge mode is signaled using Context-Adaptive Binary Arithmetic Coding (CABAC) with multiple context models and selection of the multiple context models is based on a skip flag of the current block.

11. A non-transitory computer readable storage medium having a bitstream stored therein, wherein the bitstream is to be decoded by a method for video decoding comprising:

obtaining, by a decoder, a plurality of variables for determining enablement statuses of a plurality of merge modes in a second group of merge modes;

in response to determining, by the decoder, from the plurality of variables that no merge mode in the second group of merge modes is enabled, determining, by the decoder, information of merge modes for deriving motion information of a current block, wherein the information of merge modes comprises a flag indicating whether to apply a merge mode in a first group of merge modes;

in response to determining, by the decoder, that a certain merge mode is enabled but a corresponding flag is not signaled, inferring, by the decoder, a value of the corresponding flag as opposite to an explicitly signaled merge mode flag for the current block; and in response to determining, by the decoder, from the plurality of variables that the plurality of merge modes in the second group of merge modes are enabled, determining, by the decoder, information of merge modes for deriving motion information of the current block, wherein the information of merge modes comprises a flag indicating whether to apply one of the plurality of enabled merge modes in the second group of merge modes, wherein the first group of merge modes comprises a regular merge mode, and the second group of merge modes comprises a combined inter and intra prediction (CIIP) merge mode.

12. The non-transitory computer readable storage medium of claim 11, wherein the method further comprises:

in response to determining, by the decoder, that the information of merge modes comprises a flag indicating application of a merge mode in the first group of merge modes, deriving, by the decoder, motion information of the current block using a merge mode in the first group of merge modes.

13. The non-transitory computer readable storage medium of claim 11, wherein the method further comprises:
in response to determining, by the decoder, that the information of merge modes comprises a flag indicating non-application of a merge mode in the first group of merge modes, deriving, by the decoder, motion information of the current block using a merge mode in the second group of merge modes.

14. The non-transitory computer readable storage medium of claim 11, wherein the flag indicating whether to apply one of the plurality of enabled merge modes in the second group of merge modes is derived according to a sequence parameter set (SPS) flag, and size constraints of the one of the plurality of enabled merge modes.

15. The non-transitory computer readable storage medium of claim 11, wherein the regular merge mode is signaled using Context-Adaptive Binary Arithmetic Coding (CABAC) with multiple context models and selection of the multiple context models is based on a skip flag of the current block.

* * * * *